Sept. 4, 1962  K. K. BRUECKNER  3,052,328

HYDRAULIC DECELERATING DEVICE

Filed Jan. 27, 1960

INVENTOR.
Karl K. Brueckner
BY Andrus + Starke
Attorneys

United States Patent Office 3,052,328
Patented Sept. 4, 1962

3,052,328
HYDRAULIC DECELERATING DEVICE
Karl K. Brueckner, Wauwatosa, Wis., assignor to A. O. Smith Corporation, Milwaukee, Wis., a corporation of New York
Filed Jan. 27, 1960, Ser. No. 4,929
8 Claims. (Cl. 188—96)

This invention relates to a hydraulic decelerating device and more particularly to a self-contained, permanently sealed hydraulic dash-pot unit. In transfer machinery on assembly lines for fabricating heavy parts such as large pipe sections, it is very important to accomplish the transfer quickly. Pneumatic cylinders are generally used to accelerate the workpiece since such an air cylinder inherently gives accelerated motion from the beginning to the end of its stroke. However, when a heavy workpiece is moved horizontally by such a device, it builds up a large momentum so that the shock at the end of its travel is equal to its weight multiplied by its speed in feet per second. Generally speaking, such a shock is very undesirable and to be avoided in most large-scale automated assembly lines. In the past, various attempts have been made to cushion this type of impact shock, and various devices which utilize a combination of pneumatic shock absorbers and hydraulic cushioning means have been designed. The devices which utilize a pneumatic cushioning element have a rapid recovery stroke which also may tend to damage the workpiece. Many of the hydraulic dash-pots are designed with open air reservoirs and may only be installed and used as designed, that is, they may not be oriented in more than one basic position because the open oil reservoir would spill.

The present invention solves the aforementioned problem and provides a self-contained hydraulic decelerating device for universal use wherever heavy objects are moved, and where there is a need for preventing shock at the end of the transfer stroke.

The apparatus of the invention includes a cylinder adapted to contain a hydraulic fluid and the outer walls of the cylinder are concave, so that an expandable reservoir is defined between the outer cylinder wall and a flexible jacket which surrounds it. A piston is slidably disposed within the cylinder and carries a piston rod, the outer end of which is adapted to be engaged by the article to be accelerated. The piston has a system of passages connecting its opposite surfaces through which the hydraulic fluid flows when the piston moves inwardly within the cylinder. A metering pin is positioned in the inner end of the cylinder, and is tapered so that it progressively restricts liquid flow through the passages in the piston as the piston descends upon it during a deceleration stroke. As the hydraulic flow becomes more restricted, the hydraulic pressure builds up on the surface of the piston. As the downstroke continues, the velocity of flow through the piston passages and into the expandable jacket increases, causing a substantial increase in fluid friction. The fluid friction heats the piston and other parts of the device, and this heat is dissipated into the atmosphere. Thus, a decelerating means is provided having a slow recovery stroke to prevent recoil shock, and which dissipates the kinetic energy of a moving weight in the form of heat generated by fluid friction.

The accompanying drawings illustrate the best mode presently contemplated by the inventor for carrying out the invention.

Figure 3:
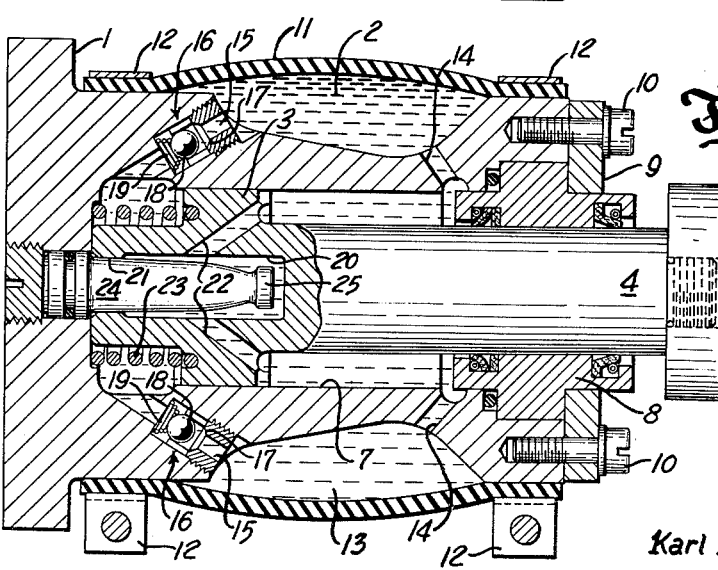
FIG. 3 is a view similar to FIGURE 1 but showing the piston at completion of the compression stroke.

As shown in the drawings, the decelerating unit includes a cylinder 1 adapted to contain a hydraulic fluid 2 and a piston 3 is slidably disposed within the cylinder. A piston rod 4 is connected with the piston and, as shown in FIG. 3, the unit is aligned so that the external end of the piston rod 4 will butt against the moving workpiece, generally indicated as a large cylindrical pipe 5, in FIG. 3. Dotted lines indicate final at-rest position of pipe 5. The arrow indicates direction of motion.

The moving pipe 5 is supported on a series of conveyor rollers 6 and engages the end of piston rod 4. Kinetic energy of pipe 5 forces the piston 3 into the cylinder 1. Resistance to movement of pipe 5 increases progressively due to the increasing restriction of the internal hydraulic flow passages of the unit. The kinetic energy of pipe 5 is transformed into fluid pressure, causing high velocity fluid flow through the internal flow system. This flow through restricted passages causes high fluid friction and heat, which is dissipated to the atmosphere. The pipe 5 comes to rest, and is transferred mechanically to the next carriage. When pipe 5 is removed from contact with piston rod 4, it recoils out to its initial position, and is ready to repeat the cycle.

The cylinder 1 is generally spool-shaped in external configuration, being somewhat larger in diameter at its ends, and has a central chamber 7 of uniform diameter which slidably receives piston 3. A seal is provided between piston rod 4 and cylinder 1 by a packing gland 8 which is held in place by a gland ring 9 secured to the end portion of cylinder 1 by a plurality of bolts 10.

The outer peripheral surface of cylinder 1 is concave and a flexible jacket 11 encloses the concave wall, being secured to the cylinder 1 at the end portions thereof by means of hose clamps 12. The jacket 11 is oil-tight and, with the concave walls of cylinder 1, defines an expandable reservoir 13. Ports 14 disposed in the vertical wall of the cylinder 1 adjacent the packing gland 8 are relatively small in diameter to restrict flow of hydraulic fluid therethrough.

The cylinder 1 has a plurality of relatively small passages 15 disposed in the vertical wall thereof near the closed end of said cylinder. The passages 15 connect the expandable reservoir 13 and the adjacent portion of the central chamber 7 of the cylinder 1. These fluid passages are provided with a plurality of check valves 16. Each check valve 16 includes a valve seat 17 threadably disposed in passage 15 and a ball valve 18, normally closed, which is held in closed relationship to valve seat 17 by means of a valve spring 19. Check valve 16 is oriented so that it will close when the fluid pressure in the central chamber 7 of cylinder 1 is about equal to, or greater than, the fluid pressure in the expandable reservoir 13. Ball valve 18 is urged to close by the combined force of valve spring 19 and fluid pressure in central chamber 7 and is designed to open when the fluid pressure in the expandable reservoir 13 exceeds the sum of the fluid pressure in chamber 7 plus the resisting force of spring 19.

Piston 3 is provided with a centrally disposed cup-like chamber 20, and orifice 21 extends through the central surface of piston 3, and connects the chamber 20 of piston 3 and the larger central chamber 7 of the cylinder 1. The piston 3 also has a plurality of fluid passages 22 of relatively small diameter which lead from the chamber 20 through the walls of the piston 3 to the opposite surface of the piston 3 adjacent the piston rod 4.

A coil spring 23 is seated in the floor of chamber 7, and is tensioned against the surface of the piston 3, to exert sufficient force to normally urge piston 3 to the opposite end of chamber 7, thereby collecting the operating fluid in the other end of chamber 7.

A tapered, stud-like metering pin 24, projects upwardly from the end surface of the central chamber of the cylinder 1. Metering pin 24 is tapered in external contour, being wider at its base than at its stem portion, and is provided with an enlarged tip 25. The base portion of the metering pin 24 is only slightly smaller in diameter than the diameter of the orifice 21, and the combined extent of orifice 21 and chamber 20 is slightly greater than the length of the stem portion of the pin 24.

The base end of metering pin 24 is threadably engaged within an opening in the closed end of cylinder 1 and the threaded joint is provided with an oil-tight sealing means.

The enlarged tip 25 of metering pin 24 prevents an initial surge of hydraulic fluid 2 by providing initial resistance to hydraulic fluid flow when pipe 5 hits the extended piston rod 4. As piston 3 encloses the metering pin 24, the tip 25 is enclosed by the orifice 21 and then by cup-like chamber 20 in that sequence. After the tip 25 has passed the orifice 21, the tapered portion of the metering pin 24 controls hydraulic fluid flow by progressively restricting orifice 21.

To fill the device initially with hydraulic fluid, the metering pin 24 is removed, and the complete apparatus is submerged, base up, in a suitable tank of hydraulic fluid. The piston rod 4 is then pumped until all chambers and passages are completely filled with oil, completely displacing all trapped air, if any.

Metering pin 24 is then reinserted in the base of cylinder 1, and the device is ready for use.

Figure 1:
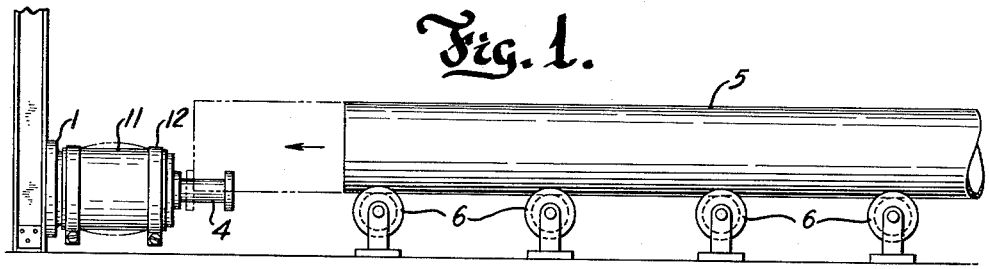
FIGURE 1 is a diagrammatic view of the decelerating device showing an application thereof in decelerating a pipe section.
Figure 2:
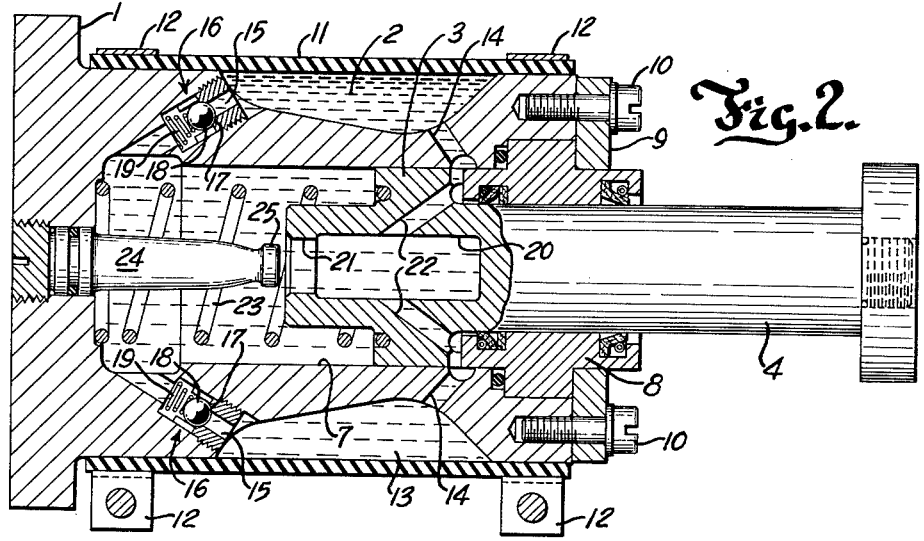
FIG. 2 is a longitudinal section of the decelerating device.

In operation, the device is secured by means of brackets to a rigid supporting member or foundation so the piston rod 4 normally projects into a head-on collison path with a moving workpiece, such as the moving pipe 5, shown in FIGURE 1. Collision of the moving pipe 5 against the end of piston rod 4 forces piston rod 4 and piston 3 into the chamber 7 of cylinder 1, simultaneously compressing spring 23. The hydraulic fluid is trapped by piston 3 and forced through orifice 21 into the chamber 20 of piston 3, and then through the relatively restricted fluid passages 21, and into the portion of chamber 6 behind piston 3. Continued compression forces the hydraulic fluid to pass through the ports 14 into the expandable reservoir 13. The high pressure, high velocity flow of hydraulic fluid through the restricted passages 22 and ports 14 creates fluid friction which heats the metal components of the device. The heat generated by the fluid friction is dissipated to the ambient atmosphere. As the piston 3 continues its motion, the orifice 21 and, subsequently, the chamber 20 envelop the metering pin 24. Metering pin 24, because of the external taper thereof, progressively fills the orifice 21, thereby gradually restricting flow of hydraulic fluid under pressure through the piston 3. The increased restriction of hydraulic fluid flow through orifice 21 progressively resists further movement of the piston 3 and piston rod 4, thereby gently halting the pipe 5. There is virtually no recoil shock at the point where pipe 5 ceases its forward motion because the hydraulic fluid is non-compressible and has passed into the expandable reservoir 13. Reservoir 13, being comprised in part of a flexible neoprene jacket 11, expands readily, and offers substantially no recoil potential back to pipe 5. When pipe 5 is removed, the spring 23 urges the piston 3 back to the top of chamber 7. Hydraulic fluid 2 then refills the lower portion of chamber 7 below piston 3. Initially, reverse flow of the hydraulic fluid is solely through check valves 17 since the orifice 21 is closed by metering pin 24 when piston 3 has completed its stroke. As piston 3 is forced back through chamber 20, the orifice 21 progressively opens and the recovery rate increases, since hydraulic fluid may now recirculate through ports 14, passages 22, chamber 20 and orifice 21 to the main portion of chamber 7. When piston 3 and piston rod 4 have returned to their initial positions, the flow of hydraulic fluid stops, and the device is ready to decelerate the next moving pipe 5.

The invention provides a novel shock absorbing device for use in conjunction with heavy transfer machinery where rapid deceleration of a moving weight is required. The mechanism is designed to be operable in any disposition in space, that is, with its axis vertical, horizontal, or any intermediate angle. There is substantially no recoil shock because the kinetic energy of the moving weight is first transformed into high velocity fluid energy.

As the flow velocity through the restricted passages increases, the fluid friction increases, generating heat, which heat is then conducted away through the metal components adjacent the restricted passages of the device.

Various modes of carrying out the invention are contemplated as being within the scope of the following claims particularly pointing out and distinctly claiming the subject matter which is regarded as the invention.

I claim:

1. A hydraulic device for decelerating a moving mass, comprising a cylinder having an internal chamber adapted to contain a hydraulic fluid, means defining an expandable low pressure reservoir for receipt of said hydraulic fluid when the device is decelerating the moving mass, said reservoir being free to expand and receive sudden surges of hydraulic fluid without creating any adverse recoil pressure, a first always open conduit means connecting said chamber with the reservoir, a piston slidably disposed within said chamber and having an inner surface and an outer surface, a second conduit means extending between said inner and outer surfaces whereby fluid in the chamber on one side of the piston will be forced through the second conduit means into the chamber on the opposite side of the piston and then through said first conduit means into said expandable reservoir when the device is operated, a piston rod extending from the outer surface of the piston outwardly of the cylinder and disposed to engage the moving mass to be decelerated, and means for varying the flow of fluid into the opening of said piston as said piston moves within said chamber to offer predetermined hydraulic resistance to the movement of said piston and thereby gently decelerating said moving mass.

2. In a hydraulic device for decelerating a moving mass, a cylinder having an internal chamber adapted to contain a hydraulic fluid, a piston slidably disposed within said chamber and having an inner surface and an outer surface and conduit means extending between said inner and outer surfaces whereby fluid in the chamber on the inner surface of the piston will be forced through said conduit means into the chamber on the outer surface of the piston as the piston moves inwardly in the internal chamber of the cylinder, a piston rod extending from the outer surface of the piston outwardly of the cylinder and disposed to engage the moving mass to be decelerated, a first set of always open passages extending through the walls of said cylinder providing restricted escape means for hydraulic fluid from the internal chamber as the piston is moved inwardly therein, a second set of normally closed passages extending through the walls of said cylinder providing means for returning hydraulic fluid into said internal chamber as the piston is moved outwardly, and means defining an expandable reservoir surrounding the walls of said cylinder providing a low pressure chamber for receiving the hydraulic fluid from the first set of passages when the device is decelerating a moving mass, said reservoir being free to expand and receive sudden surges of hydraulic fluid without creating any adverse recoil pressure, and said expandable reservoir also providing hydraulic fluid replenishment means to the internal chamber through the second set of passages as the piston moves outwardly in the cylinder.

3. A decelerating mechanism for halting a moving mass, comprising a cylinder having an internal chamber adapted to contain a hydraulic fluid, means defining an expandable, recoilless reservoir, an always open conduit means connecting said chamber with said reservoir, a piston slidably disposed within said chamber and having a recess in the inner surface and a passage communicating between the recess and the outer surface of said piston whereby fluid on the inner surface of said piston in said chamber will be forced into the chamber adjacent the outer surface of the piston and then through said conduit means into said expandable reservoir as the piston is moved inwardly within the chamber, a piston rod connected to the outer end of the piston and extending outwardly of the cylinder with the outer end of said rod adapted to engage a moving weight and rapidly decelerate said weight to a static condition with substantially no recoil, and a stud-like member mounted in the inner end of said cylinder facing the inner surface of said piston in alignment with said recess, said member being disposed to project into said chamber to progressively restrict the flow of fluid into the recess as said piston moves inwardly within said chamber to progressively resist continued inward movement of said piston and thereby decelerate said moving mass.

4. A shock absorbing mechanism for gently halting a moving body, comprising a cylinder having an internal chamber adapted to contain a hydraulic fluid, means defining an expandable, recoilless reservoir, an always open conduit means connecting said chamber with said reservoir, a piston slidably disposed within said chamber and having a recess in the inner end and having a plurality of passages communicating between the recess and the outer end of said piston whereby fluid in the chamber adjacent the inner end of said piston will be forced into said recess and through said passages and into the chamber on the opposite side of the piston and then through said conduit means to said reservoir as the piston is moved inwardly within the chamber, a piston rod connected to the outer end of the piston and extending outwardly of the cylinder with the outer end of said rod adapted to engage a moving weight and rapidly decelerate the same, a resilient member disposed in said chamber in engagement with the inner end of said piston and resiliently urging said piston toward the outer end of the cylinder, and means connected to the cylinder for progressively restricting the flow of fluid into the recess of said piston as said piston moves inwardly within said chamber to provide progressively increasing resistance to further movement of said piston, thereby gently halting the moving body with substantially no recoil.

5. A hydraulic shock absorber for decelerating a heavy object, comprising a cylinder having an internal chamber adapted to contain a hydraulic fluid, means defining an expandable reservoir having an unrestrained flexible wall, said reservoir being free to receive sudden surges of hydraulic fluid without creating any adverse recoil pressure, a first always open conduit means connecting one end of the chamber to the said expandable reservoir, a second normally closed conduit means connecting the opposite end of the chamber to said expandable reservoir, normally closed check valve means disposed in said conduit means, said check valve means being responsive to hydraulic pressure in said expandable reservoir, thereby providing refilling means for said internal chamber during the recovery stroke of said piston, a piston having an inner end and an outer end slidably disposed within said chamber and having a recess in the inner end and having a passage communicating between the recess and the outer end of said piston whereby fluid in the chamber adjacent the inner end of said piston will be forced into said recess and through said passage and into the chamber adjacent the outer end and then through said conduit means to said expandable chamber, a piston rod connected to the outer end of the piston and extending outwardly of the cylinder with the outer end of said rod adapted to resist the movement of the heavy object, and means connected to the cylinder for progressively restricting the flow of fluid into the recess of said piston as said piston moves inwardly within said chamber to rapidly decelerate and stop said heavy object.

6. A mechanism for stopping a moving mass, comprising a cylinder having an internal chamber adapted to contain a hydraulic fluid and having an external concave wall, an external flexible jacket disposed around said cylinder and secured to the outer wall of said cylinder and defining an expandable reservoir between said flexible jacket and the external concave wall of said cylinder, said expandable reservoir being adapted to receive and contain sudden surge quantities of hydraulic fluid without establishing an operative recoil pressure, conduit means connecting said internal chamber with said reservoir, a piston having an inner and outer end slidably disposed within said chamber and having a recess in the inner end thereof, a continuously open passage communicating between the recess and the outer end of said piston whereby fluid on one side of said piston in said chamber adjacent the inner end will be forced into said recess and through said passage and into the chamber on the side of the piston adjacent the outer end and then through said conduit means to said expandable reservoir as the piston is moved inwardly within the chamber, a piston rod integrally connected to the outer end of the piston and extending outwardly of the cylinder with the outer end of said rod adapted to engage and resist continued movement of the moving mass, and means connected to the cylinder for progressively restricting the flow of hydraulic fluid into the recess of said piston as said piston moves inwardly within said chamber to gently decelerate the moving mass.

7. An apparatus for decelerating a moving mass, comprising a hollow cylinder having an open end and a closed end, a plurality of always open passages extending through the wall of the cylinder near the open end and a second set of passages extending through said cylinder wall near the closed end, normally closed check valve means disposed in said second set of passages for regulating return flow of hydraulic fluid through said second set of passages into the chamber of said cylinder, a piston means disposed within the chamber of said cylinder and dividing the chamber into a first portion adjacent the closed end and a second portion adjacent the open end, a piston rod attached to said piston means adjacent the open end of said cylinder and extending through the open end of the cylinder, sealing means disposed in the open end of the cylinder and providing an oil-tight seal between the cylinder and the piston rod, resilient spring means disposed in the portion of the chamber adjacent the closed end and urging said piston to the open end portion of the chamber of the cylinder, said piston having a recess opening to the surface of said piston means adjacent the closed end of the cylinder, conduit means extending in said piston and connecting said axial recess with the portion of said chamber adjacent the open end of the piston, a tapered stud-like pin extending within the chamber and connected to the closed end of said cylinder, a flexible jacket surrounding the external wall of said cylinder and secured to the wall thereof at each end of the cylinder, to provide an expandable oil reservoir between the wall of the cylinder and the jacket, said reservoir being free to expand and receive sudden surges of hydraulic fluid without creating any adverse recoil pressure, said hydraulic fluid completely filling all internal chambers, apertures, recesses and passages to provide a self-contained, sealed hydraulic decelerating device for gently halting a moving mass.

8. A decelerating device, comprising a cylinder having an internal chamber adapted to contain a hydraulic fluid and having an external wall, a flexible jacket disposed around said cylinder and secured to the external wall of said cylinder to define an expandable hydraulic fluid chamber between said flexible jacket and the external wall of said cylinder always open, said chamber being free to expand and receive sudden surges of hydraulic fluid without creating any adverse recoil pressure, conduit means connecting said chamber with said reservoir, a piston slidably disposed within said chamber and having a recess in the inner end of said piston and having fluid passages communicating between the recess and the outer end of said piston, a piston rod connected to the outer end of the piston and extending outwardly of the cylinder, and a tapered member having an enlarged tip projecting into the internal chamber of said cylinder cooperating with said recess to progressively restrict hydraulic fluid flow as the recess encloses said member during inward movement of the piston, said enlarged tip providing initial resistance to fluid flow in response to sudden impact against the end of said piston rod.

References Cited in the file of this patent

UNITED STATES PATENTS

| | | |
|---|---|---|
| 713,691 | Schneider et al. | Nov. 18, 1902 |
| 745,582 | Dittbenner | Dec. 1, 1903 |
| 1,576,286 | Lang | Mar. 9, 1926 |
| 1,655,786 | Guerritore | Jan. 10, 1928 |
| 2,027,966 | Dubonnet | Jan. 14, 1936 |
| 2,538,375 | Montgomery | Jan. 16, 1951 |
| 2,628,692 | Hufferd | Feb. 17, 1953 |
| 2,802,664 | Jackson | Aug. 13, 1957 |
| 2,914,195 | Pawling | Nov. 24, 1959 |

FOREIGN PATENTS

| | | |
|---|---|---|
| 995,585 | France | Aug. 22, 1951 |

UNITED STATES PATENT OFFICE
CERTIFICATE OF CORRECTION

Patent No. 3,052,328 September 4, 1962

Karl K. Brueckner

It is hereby certified that error appears in the above numbered patent requiring correction and that the said Letters Patent should read as corrected below.

Column 1, line 47, for "accelerated" read -- decelerated --.

Signed and sealed this 12th day of February 1963.

(SEAL)
Attest:

ERNEST W. SWIDER
Attesting Officer

DAVID L. LADD
Commissioner of Patents